United States Patent
Pan

(10) Patent No.: US 9,910,748 B2
(45) Date of Patent: Mar. 6, 2018

(54) REBUILDING PROCESS FOR STORAGE ARRAY

(71) Applicant: Futurewei Technologies, Inc., Plano, TX (US)

(72) Inventor: Weimin Pan, Spring, TX (US)

(73) Assignee: Futurewei Technologies, Inc., Plano, TX (US)

(*) Notice: Subject to any disclaimer, the term of this patent is extended or adjusted under 35 U.S.C. 154(b) by 108 days.

(21) Appl. No.: 14/986,561

(22) Filed: Dec. 31, 2015

(65) Prior Publication Data

US 2017/0192865 A1 Jul. 6, 2017

(51) Int. Cl.
| | | |
|---|---|---|
| *G06F 11/00* | (2006.01) | |
| *G06F 11/20* | (2006.01) | |
| *G06F 3/06* | (2006.01) | |
| *G06F 12/02* | (2006.01) | |
| *G06F 11/10* | (2006.01) | |

(52) U.S. Cl.
CPC ........ *G06F 11/2094* (2013.01); *G06F 3/0619* (2013.01); *G06F 3/0647* (2013.01); *G06F 3/0689* (2013.01); *G06F 11/1092* (2013.01); *G06F 12/023* (2013.01); *G06F 2201/805* (2013.01); *G06F 2212/1041* (2013.01)

(58) Field of Classification Search
CPC ............. G06F 11/2094; G06F 11/0727; G06F 11/1076; G06F 11/1092; G06F 11/1612; G06F 11/2053; G06F 11/2089; G06F 3/0619; G06F 3/0647; G06F 3/0689; G06F 12/023; G06F 2201/805; G06F 2201/1041

USPC ................ 714/6.22, 6.21, 6.24, 42
See application file for complete search history.

(56) References Cited

U.S. PATENT DOCUMENTS

| | | | |
|---|---|---|---|
| 9,268,644 B1 * | 2/2016 | Subramanian ............ G06F 3/06 |
| 2014/0215147 A1 * | 7/2014 | Pan ....................... G06F 11/1092 711/114 |
| 2014/0215262 A1 * | 7/2014 | Li ........................ G06F 11/0727 714/6.21 |
| 2016/0092309 A1 * | 3/2016 | Gao ....................... G06F 11/108 714/6.23 |

* cited by examiner

*Primary Examiner* — Joseph D Manoskey
(74) *Attorney, Agent, or Firm* — Futurewei Technologies, Inc.

(57) ABSTRACT

When a drive in a redundant array of independent disks (RAID) fails, for a first stripe unit stored in the failed drive, a RAID controller obtains from a bitmap a first indicator indicating whether the first stripe unit contains written data, wherein the bitmap contains a plurality of indicators corresponding to stripe units stored in the failed drive, and the first stripe unit belongs to a first stripe stored in the RAID system; if the first indicator indicates that the first stripe unit does not contain written data, write zeros into a first replacement stripe unit in a replacement drive, wherein the first replacement stripe unit replaces the first stripe unit in the first stripe. Without performing XOR operations for the stripe units indicated no data by the table, a time consumed for rebuilding can be significantly reduced, recovering the RAID array healthy sooner and reducing the impact on system bandwidth usage and host I/O performance impact during the rebuild process.

19 Claims, 7 Drawing Sheets

UNMAP command

| Byte \ Bit | 7 | 6 | 5 | 4 | 3 | 2 | 1 | 0 |
|---|---|---|---|---|---|---|---|---|
| 0 | \multicolumn{8}{c}{OPERATION CODE (42h)} ||||||||
| 1 | \multicolumn{7}{c}{Reserved} | ANCHOR |||||||
| 2 ... 5 | \multicolumn{8}{c}{Reserved} ||||||||
| 6 | \multicolumn{4}{c}{Reserved} | \multicolumn{4}{c}{GROUP NUMBER} |||||||
| 7 | (MSB) | | | | | | | |
| 8 | \multicolumn{7}{c}{PARAMETER LIST LENGTH} | (LSB) |||||||
| 9 | \multicolumn{8}{c}{CONTROL} ||||||||

FIG. 7a

WRITE SAME (10) command

| Byte \ Bit | 7 | 6 | 5 | 4 | 3 | 2 | 1 | 0 |
|---|---|---|---|---|---|---|---|---|
| 0 | \multicolumn{8}{c}{OPERATION CODE (41h)} ||||||||
| 1 | \multicolumn{3}{c}{WRPROTECT} | ANCHOR | UNMAP | \multicolumn{3}{c}{Obsolete} ||||
| 2 | (MSB) | | | | | | | |
| ... 5 | \multicolumn{7}{c}{LOGICAL BLOCK ADDRESS} | (LSB) |||||||
| 6 | \multicolumn{4}{c}{Reserved} | \multicolumn{4}{c}{GROUP NUMBER} ||||
| 7 | (MSB) | | | | | | | |
| 8 | \multicolumn{7}{c}{NUMBER OF LOGICAL BLOCKS} | (LSB) |||||||
| 9 | \multicolumn{8}{c}{CONTROL} ||||||||

FIG. 7b

REBUILDING PROCESS FOR STORAGE ARRAY

BACKGROUND

Redundant Arrays of Independent Disks (RAID) technology is implemented in mass storage of data. A RAID array is a logical structure including multiple RAID disks that work together to improve storage reliability and performance. One implementation of a RAID technique implements a mirrored array of disks whose aggregate capacity is equal to that of the smallest of its member disks. Another implementation of a RAID technique implements a striped array whose aggregate capacity is approximately the sum of the capacities of its members. RAID technology can provide benefits compared to individual disks such as improved I/O performance due to load balancing, improved data reliability, improved storage management.

Several classifications or levels of RAID are known—RAID 0, RAID 1, RAID 5, and RAID 6. Certain RAID arrays, for example, RAID 1, RAID 5, RAID 6, implement added computations for fault tolerance by calculating the data into drives and storing the results in another drive. The parity is computed by an exclusive OR Boolean operation (XOR). When a drive fails, the data in the drive that has failed can be recovered from the other drives using the computed parity so that the recovered data can be written to a replacement drive.

SUMMARY

This specification describes a rebuild process for the storage array. Certain aspects of the subject matter described here can be implemented as a method performed by a redundant array of independent disks (RAID) controller.

When a drive in the RAID system fails, for a first stripe unit stored in the failed drive, the RAID controller obtains from a bitmap a first indicator indicating whether the first stripe unit contains written data, wherein the bitmap contains a plurality of indicators corresponding to stripe units stored in the failed drive, and the first stripe unit belongs to a first stripe stored in the RAID system. If the first indicator indicates that the first stripe unit does not contain written data, the RAID controller writes zeros into a first replacement stripe unit in a replacement drive, wherein the first replacement stripe unit replaces the first stripe unit in the first stripe. If the first indicator indicates that the first stripe unit contains written data, the RAID controller recover data for the first stripe unit from data stored in other stripe units of the first stripe; and write the recovered data to the first replacement stripe unit in the replacement drive.

Certain aspects of the subject matter described here can be implemented as a redundant array of independent disks (RAID) controller configured to perform operations described here. Certain aspects of the subject matter described here can be implemented as a computer-readable medium storing instructions executable by one or more processors to perform operations described here. Certain aspects of the subject matter described here can be implemented as a system including one or more processors and a computer-readable medium storing instructions executable by the one or more processors to perform operations described here.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7a is a block diagram illustrating SCSI UNMAP command.

FIG. 7b is a block diagram illustrating SCSI WRITE SAME command.

DETAILED DESCRIPTION

Figure 1:
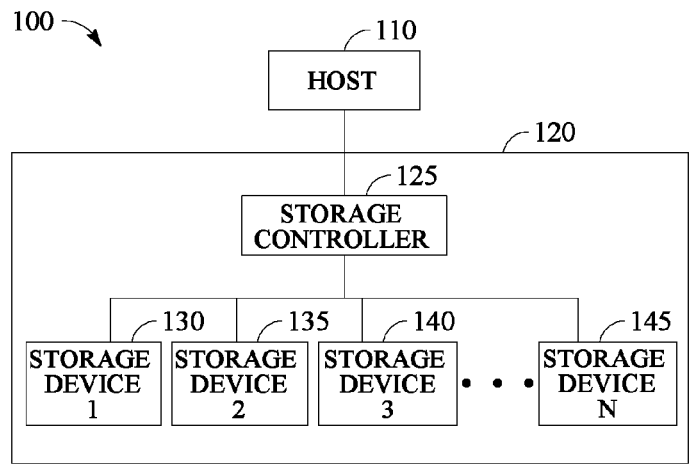
FIG. 1 is a block diagram of a system illustrating a host coupled to a RAID system according to an example embodiment.

FIG. 1 is a block diagram of a system 100, illustrating a host 110 coupled to a RAID system 120 that includes a storage controller 125 that stores data on multiple storage devices, such as drives 130, 135, 140, and 145. The multiple storage devices compose a storage device array. The storage device array can be named as RAID array. Similarly, the storage controller can be named as RAID controller too. If the drives are solid-state drives (SSDs), the RAID array may be called as an SSD array. If the drives are hard disk drives (HDDs), the RAID array may be called as an HDD array. RAID system 120 may include parity information stored on one or more of the drives to insure that, if one drive fails, the data on that drive may be restored from data on other drives. There are many different levels of RAID systems having varying degrees of redundancy and parity.

In prior art, when a drive fails, the controller rebuilds all the data on that failed drive by performing XOR operations regardless of stripes of the drive contain data or not, which can affect write performance and endurance. Since it needs to read rest drives to regenerate all the data on that failed drive and writes it to a replacement drive, the rebuild process in the prior art uses lots of system bandwidth, and uses lots of network bandwidth in a distributed storage system.

Figure 2:
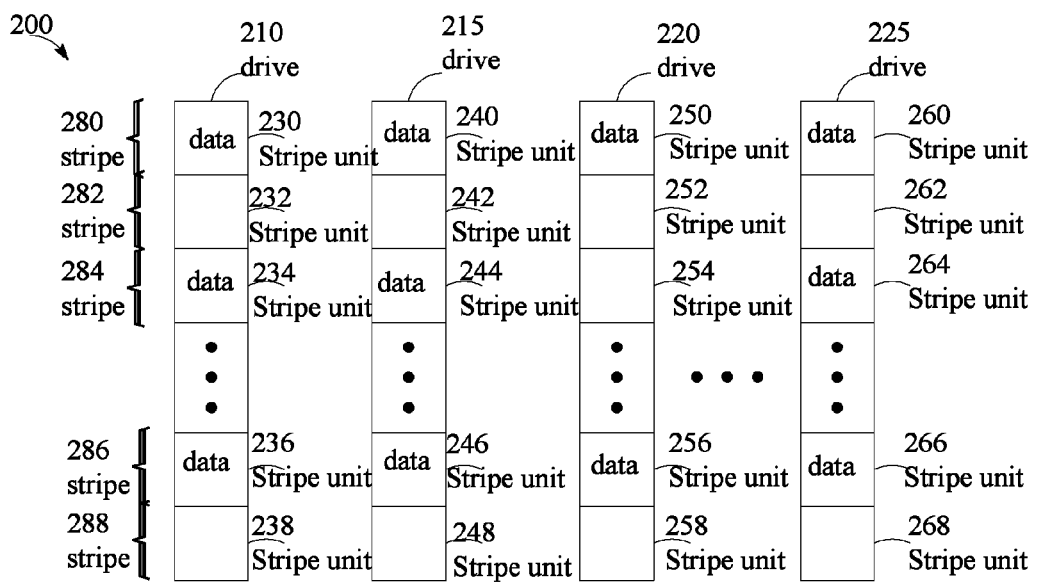
FIG. 2 is a block diagram illustrating stripes of data on a storage device array according to an example embodiment.

FIG. 2 is a block diagram illustrating striping of disk drives generally at 200 corresponding to an array of disk drives divided into stripe units of data in stripes. RAID systems that include parity generally divide data into stripe units, which may be at the bit level, byte level, page level, or any other desired quantity of data such as 512 bytes, 1024 bytes, larger powers of two, or other quantities. Different level RAID systems are currently standardized. For instance, RAID 2 utilizes bit level striping where each sequential bit is on a different drive with a parity bit stored on at least one parity drive. RAID 3 utilizes byte level striping. RAID 4-6 use block level striping.

Stripe units are illustrated for four drives 210, 215, 220, and 225 in FIG. 2, each with multiple stripe units of data indicated at 230, 232, 234, 236 and 238 for drive 210, stripe units 240, 242, 244, 246 and 248 for drive 215, stripe units 250, 252, 254, 256 and 258 for drive 220, stripe units 260, 262, 264, 266 and 268 for drive 225. Each stripe unit is identified by respective logical block addresses (LBAs). For example, LBAs 1-10, LBAs 11-20, LBAs 21-30, and LBAs 31-40 can be stored on stripe unit 230 of drive 210, stripe unit 240 of drive 215, stripe unit 250 of drive 220, and stripe unit 260 of drive 225, respectively. In this manner, the stripe units can be stored in rows, each row including a drive included in the RAID system. Striping combines several storage drives into a single row. A stripe, therefore, identifies a combination of data drives. For example, stripe 280 identifies stripe unit 230 of drive 210, stripe unit 240 of drive 215, stripe unit 250 of drive 220, and stripe unit 260 of drive 225. Stripe 282 identifies stripe unit 232 of drive 210, stripe unit 242 of drive 215, stripe unit 252 of drive 220, and stripe unit 262 of drive 225. Stripe 284 identifies stripe unit 234 of drive 210, stripe unit 244 of drive 215, stripe unit 254 of drive 220, and stripe unit 264 of drive 225. Similarly, stripe 286 identifies stripe unit 236 of drive 210, stripe unit 246 of drive 215, stripe unit 256 of drive 220, and stripe unit 266 of drive 225. Stripe 288 identifies stripe unit 238 of drive 210, stripe unit 248 of drive 215, stripe unit 258 of drive 220, and stripe unit 268 of drive 225. The RAID array 200 can be identified by multiple stripes, for example, stripe 280, stripe 282, stripe 284, and so on until stripe 288.

Initialization of the RAID array is performed by the storage controller 125 in one embodiment. Foreground initialization may be performed by simply writing zeroes to all the drives so that they all have the same values, overwriting any existing data in the process. After host writes data to some stripe units, such as stripe units 230, 240, 250, 260, 234, 244, 264, 236, 246, 256 and 266, these stripe units include data, other stripe units are empty. In some implementations, a stripe can identify multiple rows, each row including data drives. One of the stripe units in each stripe may include parity information, which in different RAID levels may be spread between drives.

Figures 3, 4:
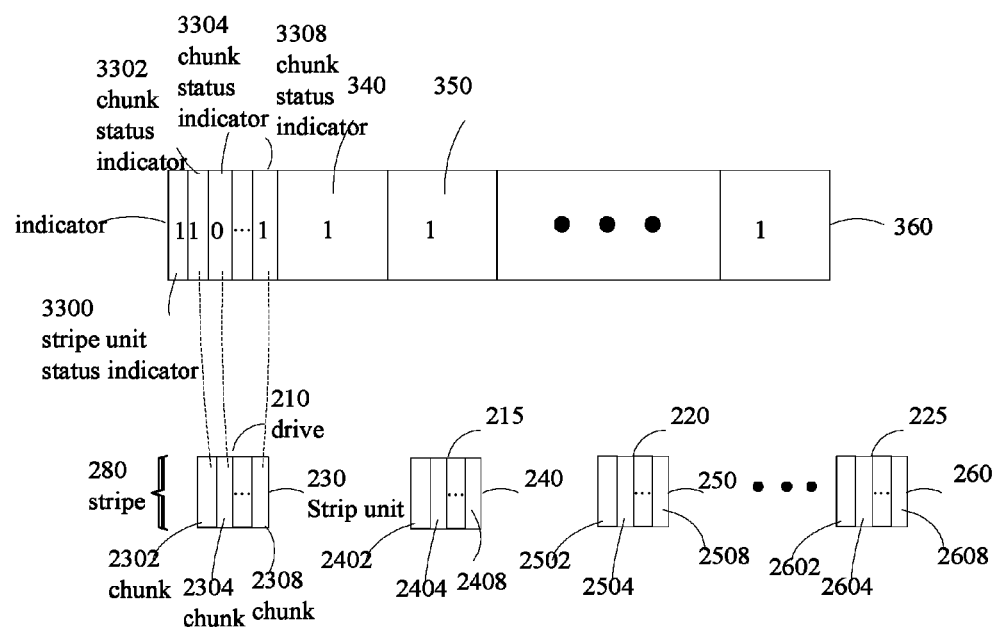
FIG. 3 is a block diagram illustrating a bitmap indicative of stripes according to an example embodiment.
FIG. 4 is a block diagram illustrating chunks of data on a storage device array with a bitmap indicative of the chunks according to an example embodiment.

In one embodiment, a table, as shown in FIG. 3, which may be in the form of a bitmap 300 may be used by the controller to keep track of stripes that have been written or deleted by a host, such as host 110. The table may be any type of data structure from which a stripe may be identified and the written or the deleted status of the stripe indicated. In an example, one or more bits in bitmap 300 is used to indicate a status of a stripe. In another example, one or more bits in bitmap 300 is used to indicate a status of a stripe unit. The bits may be assigned sequentially in one embodiment. For example, an indicator 330 corresponds to stripe unit 230, an indicator 340 corresponds to stripe unit 240, an indicator 350 corresponds to stripe unit 250, an indicator 360 corresponds to stripe unit 260, and so on until an indicator 368 corresponds to stripe unit 268. Because stripe units 230, 240, 250, 260, 234, 244, 264, 236, 246, 256 and 266 include data, indicators 330, 340, 350, 360, 334, 344, 364, 336, 346, 356 and 366 are indicated as "1" (or other "No" or "Off" indicator). Other stripe units are empty (no data), so other indicators are indicated as "0".

Figure 9:
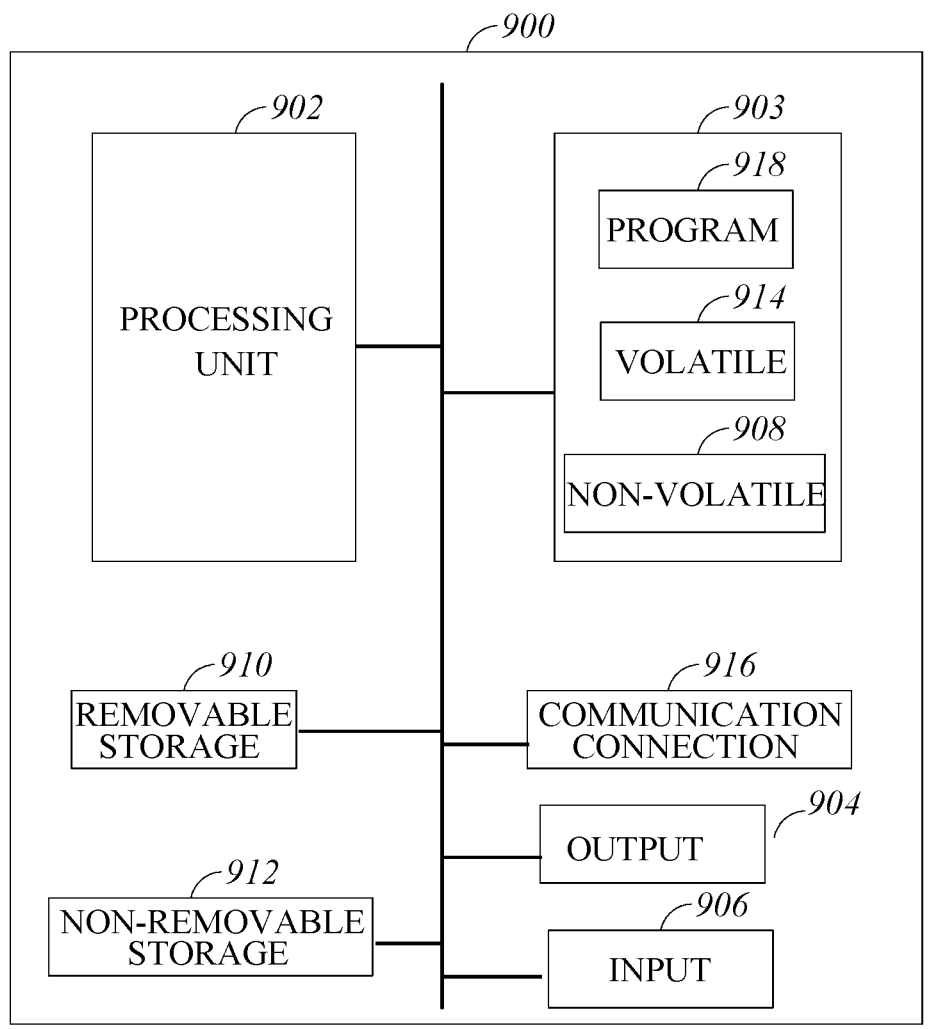
FIG. 9 is a block schematic diagram of a computer system 900 to implement the controller and methods according to an example embodiment.

The table 300 in one embodiment may be stored in a persistent memory that can survive a power loss, such as a memory 908 as shown in FIG. 9. The memory 908 in FIG. 9 includes a non-volatile memory, or a non-volatile random access memory (NVRAM) or a non-volatile static random access memory (NVSRAM). The table 300 may have a number of bits equal to or greater than the number of stripe units in various embodiments.

This specification describes an alternative technique to improve the rebuild efficiency in a RAID array. As described above, a bitmap 300 is implemented to track each ongoing write operation and each ongoing delete operation. An indicator is set in the table for the stripe unit, and may contain one or more bits. If data of a stripe unit is written, an indicator corresponding to the stripe unit is set to "1". By contrary, if data of a stripe unit is deleted, an indicator corresponding to the stripe unit is set to "0". If no data is included in a stripe unit, an indicator corresponding to the stripe unit is set to "0" too. During a rebuild process, only those stripe units with "1" indicators in the table need be rebuilt, thereby negating a need to perform rebuilding for the entire storage array.

In order to improve a rebuild performance, a stripe unit can include multiple chunks, and a bit is set in a table for a chunk. The chunk includes one or more blocks. If data of a chunk is written, the bit corresponding to the chunk is set to "1". The bit corresponding to the chunk may be called as a chunk status indicator. By contrary, if data of a chunk is deleted, the bit corresponding to the chunk is set to "0". If no data is included in a chunk, the bit corresponding to the chunk is set to "0" too. For example, for the stripe 280 in FIG. 4, stripe unit 230 of drive 210 includes chunks 2302, 2304, and 2308; stripe unit 240 of drive 215 includes chunks 2402, 2404, and 2408; stripe unit 250 of drive 220 includes chunks 2502, 2504, and 2508; and stripe unit 260 of drive 225 includes chunks 2602, 2604, and 2608. Correspondingly, indicator 330 of table 300 includes stripe unit status indicator 3300, chunk status indicators 3302, 3304 and 3308. In an example, stripe unit status indicator 3300 may be used to indicate the stripe unit 230. If any chunk in the stripe unit 230 contains data, the stripe unit status indicator 3300 is set to "1". If none of chunks 2302, 2304 and 2308 contains data, the stripe unit status indicator 3300 is set to "0". In other example, no special indicator is used to indicate a stripe unit, such as, no stripe unit status indicator 3300 indicates stripe unit 230 in the table 300. Take a bit indicating a chunk for example, the bit 3302 is used to indicate the chunk 2302. If the chunk 2302 contains data, the bit 3302 corresponding to the chunk 2302 is set to "1". If the chunk 2304 does not contain data, the bit 3304 corresponding to the chunk 2304 is set to "0". If the chunk 2308 contains data, the bit 3308 corresponding to the chunk 2308 is set to "1". For the chunks 2302 and 2308 contain data, the bit 3300 is set to "1". Similarly, the indicator 340 of table 300 may include multiple bits to indicate chunks 2402, 2404, and 2408; the indicator 350 of table 300 may include multiple bits to indicate chunks 2502, 2504 and 2508, and the indicator 360 of table 300 may include multiple bits to indicate chunks 2602, 2604 and 2608. FIG. 4 uses stripe 280 as an example, chunks in other stripes may be indicated by bits in the table 300 too.

If none of chunks of a stripe unit (such as chunks of stripe unit 232) contains data, the stripe unit status indicator of the stripe unit is set to "0", and no need to use multiple bits to indicate the multiple chunks. In this manner, the size of the table 300 can be limited to one stripe unit status indicator to those stripe units without data.

Figure 5:
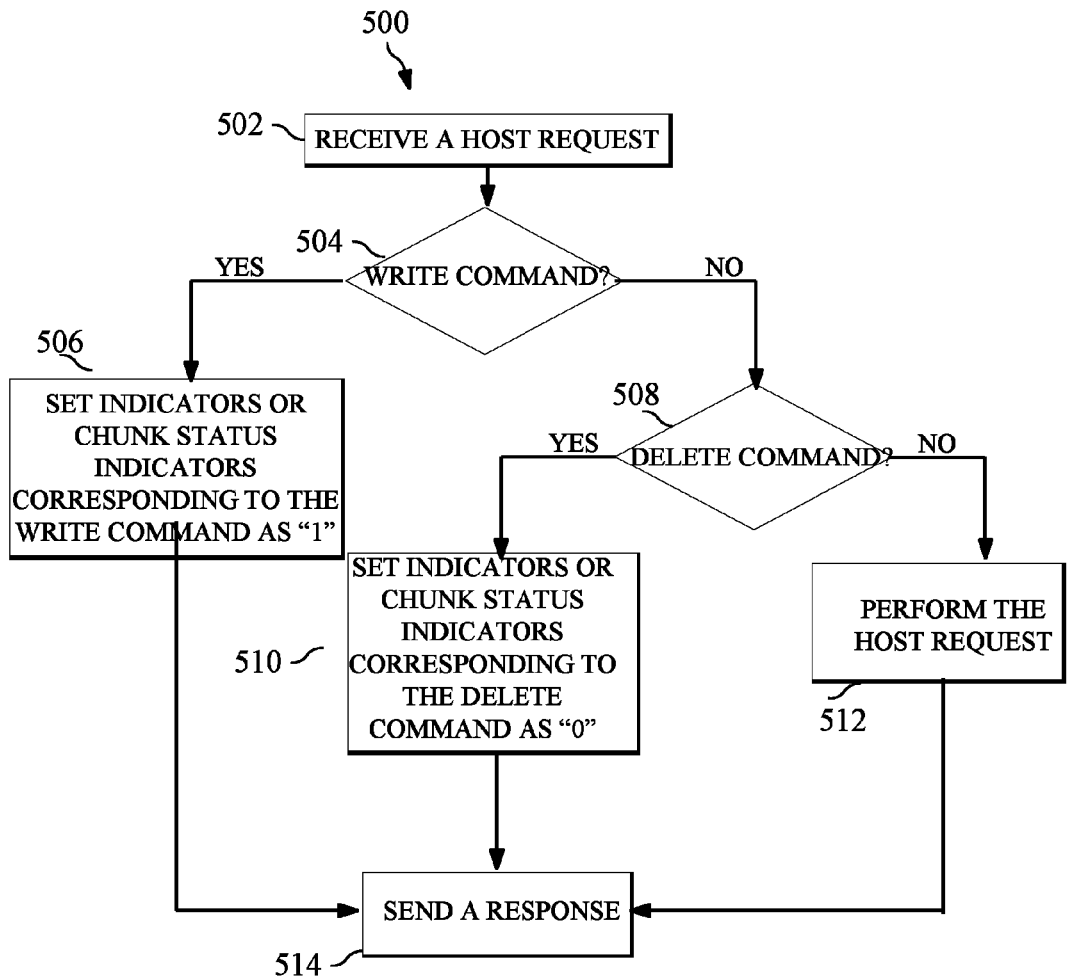
FIG. 5 is a flowchart illustrating a method of keeping track a stripe unit or a chunk by using the table 300 according to an example embodiment.

FIG. 5 is a flowchart of an example of a process 500 of keeping track a stripe unit or a chunk by using the table 300. In some implementations, the process 500 can be implemented by a storage controller, for example, the RAID controller 125. The controller can be connected to each drive in the RAID array, and can be configured to execute instructions to perform operations including writing data to the drives, deleting data from the drives, and determining parity data and parity inconsistencies (for example, by performing XOR operations).

At 502, a host request is received. If the host request is a write command, LBA and data to be written are included in the host request. For example, the controller can receive one or more write commands from the host. Each write command can include a command to write stripe units of data to multiple drives in the RAID array. The controller can be configured to process a certain number of write commands at a time, for example, 1024 write commands. In addition, although the host issues the multiple commands at the same time, the controller may not process all write commands simultaneously. For example, when the host issues a maximum number of write commands that the controller is configured to execute, the controller can process the write commands in batches (for example, 1 at a time, 2 at a time, 10 at a time). Moreover, for each command, the controller may first process the command to write stripe units of data to the drives in the RAID array.

If the host request is a delete command, LBA to be deleted are included in the host request. For example, the controller can receive one or more delete commands from the host. Each delete command can include a command to delete stripe units of data from multiple drives in the RAID array.

At 504, the controller decides that the host request is a write command or not. If the host request is a write command, the controller can use LUNs and LBAs mapping to identify a data drive in which stripe units of data are to be written from the write command, a stripe in which the stripe units of data are to be written, and a number of rows in the stripe. In response to the identification, the controller can set corresponding indicators or chunk status indicators in the table. Such as, the controller sets the indicators representing the one or more stripe units corresponding to the write command in the table 300 as "1", or the controller sets the chunk status indicators representing the one or more chunks corresponding to the write command in the table 300 as "1" at 506. Turning to the example described above with reference to FIG. 2 and FIG. 3, the host wants to write data to LBAs 50-150. The controller maps the LBAs to stripe units 230, 240, 250, 260 and 232, and then the controller can execute the write command to write the stripe units of data to the data drives identified by the LUN number and LBA mapping, such as writes the data to stripe units 230, 240, 250, 260 and 232. The controller needs to set the indicator 330 which represents stripe unit 230 in table 300 as "1". Similarly, the indicator 340 which represents stripe unit 240 in table 300 is set to "1", the indicator 350 which represents stripe unit 250 in table 300 is set to "1", the indicator 360 which represents stripe unit 260 in table 300 is set to "1", and the indicator 332 which represents stripe unit 232 in table 300 is set to "1" too. Turning to the example described above with reference to FIG. 2 and FIG. 4, the strip status indicator 3300 which represents stripe unit 230 is set to "1". The chunk status indicator 3302 which represents chunk 2302 in table 300 is set to "1", the chunk status indicator 3304 which represents chunk 2304 in table 300 is set to "0", and the chunk status indicator 3308 which represents chunk 2308 in table 300 is set to "1". In instances in which the write command has been successfully executed, the controller can return a write complete response to the host at 514.

If the controller decides that the host request is not a write command, the controller continues to decide the host request is a delete command or not at 508. If the host request is a delete command, the controller can use LUNs and LBAs mapping to identify a data drive in which stripe units of data are to be deleted from the delete command, a stripe in which the stripe units of data are to be deleted, and a number of rows in the stripe. In response to the identification, the controller can set corresponding indicators or chunk status indicators in the table. Such as, the controller sets the indicators representing the one or more stripe units corresponding to the delete command in the table 300 as "0", or the controller sets the chunk status indicators representing the one or more chunks corresponding to the delete command in the table 300 as "0" at 510. Turning to the example described above with reference to FIG. 2 and FIG. 3, the host wants to delete data from LBAs 120-150. The controller maps the LBAs to stripe unit 232 and part of stripe unit 260, and then the controller deletes the data from stripe units 232, and part of stripe unit 260. The controller needs to set the indicator 332 which represents stripe unit 232 in table 300 as "0", and keep the indicator of stripe unit 260 as "1" according to FIG. 3. But, turning to the another example described above with reference to FIG. 2 and FIG. 4, if the part of stripe unit 260 includes chunks 2604 and 2608, the chunk status indicators 3604 and 3608 which represent the chunks 2604 and 2608 can be set as "0" although the chunk status indicator 3600 which represents stripe unit 260 as "1". In instances in which the delete command has been successfully executed, the host can return a delete response to the host at 514.

If the host request is not a delete command, such as, the host request may be a read command, and the controller performs the host request at 512 and then sends a response to the host at 514.

Moreover, a medium scan can be performed by reading data in the disk storage drives. In some implementations, a storage controller, for example, the RAID controller 125, can perform the medium scan. If the RAID controller finds all the chunks in a stripe unit does not contain data, the stripe unit status indicator of the stripe unit would be set to "0". Such as, the controller deletes data from chunk 2602 on another delete command. When the controller does the medium scan (or other types checking), the controller finds all the chunks of the stripe unit 260 contain no data, and would change the stripe unit status indicator 3600 which represents the stripe unit 260 to "0".

When a drive fails, the failed drive will need to be replaced, and the RAID array will need to be rebuilt. Data of the failed drive can be regenerated using data of other drives in the RAID system. For example, the data of the failed drive can be determined by performing exclusive Boolean OR operations. Such as, the drive 215 fails in an example.

Figure 6:
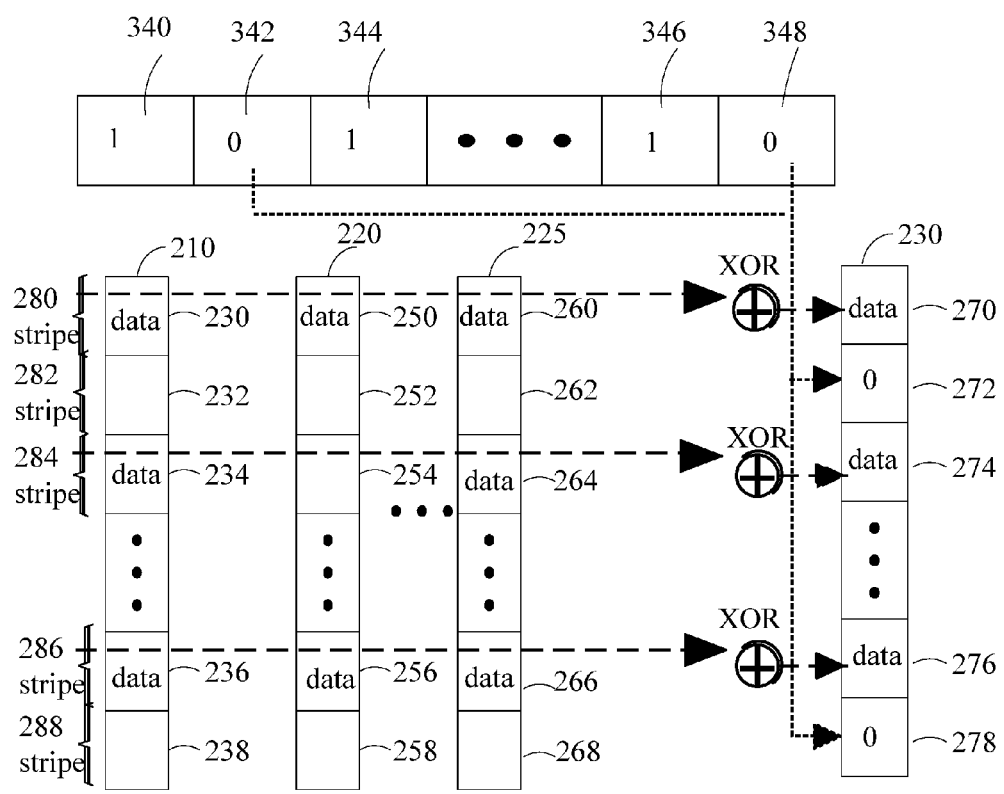
FIG. 6 is a schematic diagram showing rebuilding of the failed drive according to an example embodiment.

FIG. 6 is a schematic diagram showing rebuilding of the failed drive according to an example embodiment. In some implementations, the rebuilding process can be implemented by a storage controller, for example, the RAID controller 125.

As described above, according to the table 300, stripe units 340, 344 and 346 of the failed drive 215 include data, and stripe units 342 and 348 of the failed drive 215 are empty. The data to be written to stripe unit 270 of a replacement drive 230 is obtained by performing XOR operations on the data stored in each drive in the stripe 280 as shown in Equation 1.

$$D(270)=D(230) \text{ XOR } D(250) \text{ XOR } D(260) \tag{Eq.1}$$

Similarly, the data to be written to stripe unit 274 of the replacement drive 230 is obtained by performing XOR operations on the data stored in each drive in the stripe 284 as shown in Equation 2.

$$D(274)=D(234) \text{ XOR } D(254) \text{ XOR } D(264) \quad \text{(Eq.2)}$$

The data to be written to stripe unit 276 of the replacement drive 230 is obtained by performing XOR operations on the data stored in each drive in the stripe 286 as shown in Equation 3.

$$D(276)=D(236) \text{ XOR } D(256) \text{ XOR } D(266) \quad \text{(Eq.3)}$$

As disclosed above, the storage controller uses normal regenerative rebuild algorithm, such as MDS (n, k) (maximum distance separable) erasure coding. MDS (n, k) erasure coding is a technique that take n storage devices and encode them onto k additional storage devices, and have the entire system be resilient to up to k device failures. MDS codes are an important class of stripe unit codes since, for a fixed n and k, they have the greatest error correcting and detecting capabilities.

But, for the stripe units have no data, the storage controller does not need to use the normal regenerative rebuild algorithm, such as performing XOR operations. The storage controller can use SCSI command to rebuild an empty stripe unit for the RAID array. For example, the storage controller can use SCSI UNMAP (Small Computer System Interface UNMAP) command to rebuild an empty stripe unit for an SSD array and use SCSI WRITE SAME command to rebuild an empty stripe unit for an HDD array.

The UNMAP command (see FIG. 7a) requests that the RAID controller cause one or more LBAs to be unmapped.

The OPERATION CODE field is defined in SPC-4 and shall be set to the value shown in the FIG. 7a for the UNMAP command.

The PARAMETER LIST LENGTH field specifies the length in bytes of the UNMAP parameter list that is available to be transferred from the Data-Out Buffer.

The WRITE SAME command (see FIG. 7b) requests that the RAID controller transfer a single logical stripe unit from the Data-Out Buffer and for each LBA in the specified range of LBAs:

Perfrom a write operation using the contents of that logical stripe unit; or

Perfrom an unmap operation.

The OPERATION CODE field is defined in SPC-4 and shall be set to the value shown in the FIG. 7b for the WRITE SAME(10) command.

The LOGICAL STRIPE UNIT ADDRESS field specifies the LBA of the first logical stripe unit accessed by this command.

For this example shown at FIG. 6, during a rebuild process, only those stripe units with "1" indicators in the table need to be rebuilt. Moreover, if a stripe unit (such as stripe unit 230) contains data, but a chunk (such as chunk 234) of the stripe unit (such as stripe unit 230) does not contain data, XOR operation does not needed for the chunks during the rebuilding process.

Without performing XOR operations for the stripe units or chunks indicated "0" by the table, a time consumed for rebuilding can be significantly reduced, recovering the RAID array healthy sooner and reducing the impact on system bandwidth usage and host I/O performance impact during the rebuild process. Moreover, by using SCSI UNMAP command to transfer unused space from a failed SSD to a spare SSD during the rebuild process, SSD drives write performance and endurance are improved. Especially, network bandwidth usage in a distributed storage system can be reduced too.

Figure 8:
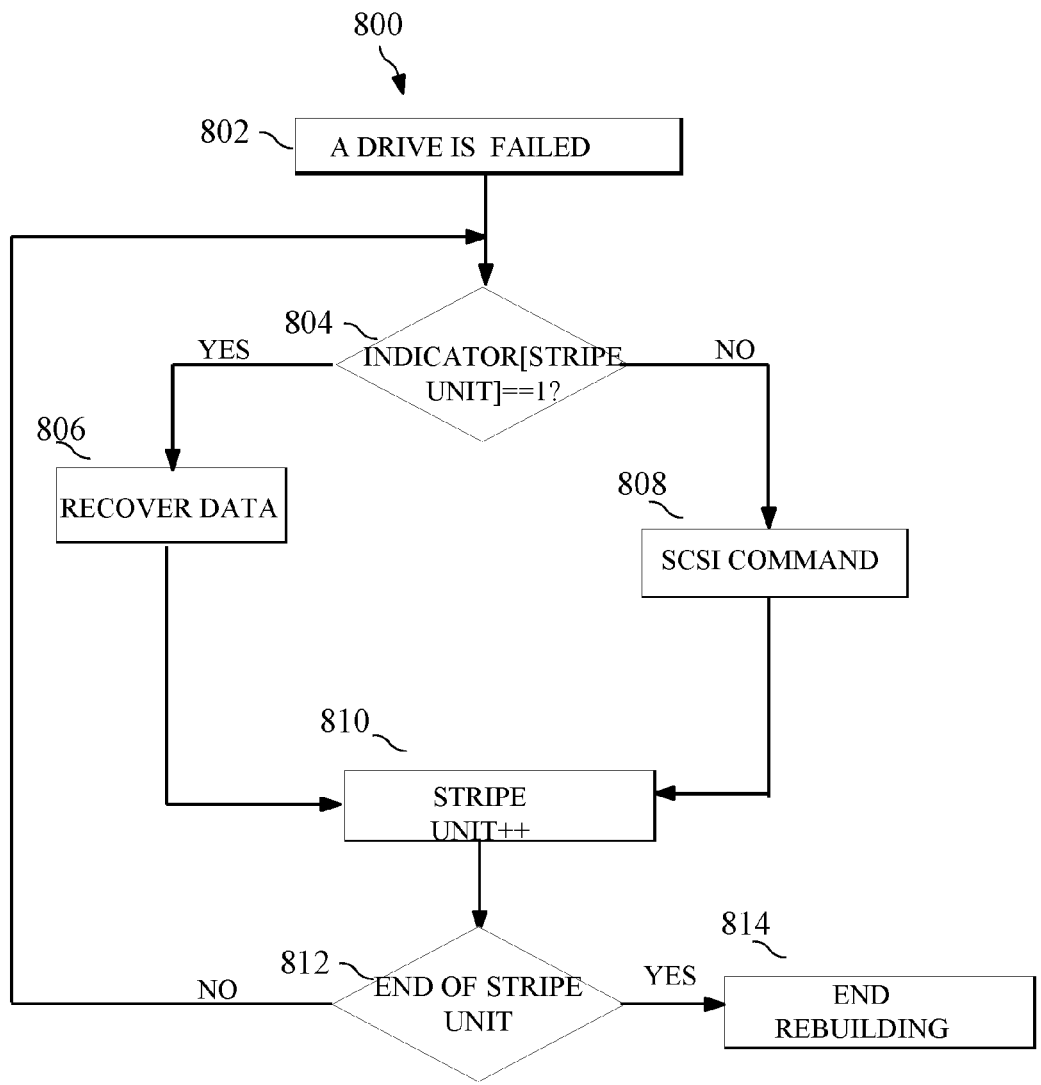
FIG. 8 is a flowchart illustrating a method of recovering data when a drive fails according to an example embodiment.

FIG. 8 is a flowchart showing recovering data in a disk drive in an RAID array. At 802, a drive fails. For example, if the drive 215 fails, and the stripes 280, 284 and 286 are parity-consistent, the data that was previously written to the drive 215 can be recovered by performing XOR operations on the data written to the drive 210, the drive 220, and the drive 225, and then writing the recovered data on the drive 230.

As described earlier, each indicator in the table 300 is an indication that a stripe unit of drive 215 contains data or not. The controller can examine the table to determine a value of the indicator at 804. If the value of the indicator is "1", the controller performs XOR operations to recover the data at 806. If the value of the indicator is "0", the controller does not need to perform XOR operations to recover the data, and can directly use SCSI command to write a stripe unit of the replacement drive with zero at 808. Such as, the controller checks indicator 340 which indicates stripe unit 240. The value of indicator 340 is "1", so the controller recovers the data 240 by performing XOR operations on the data written to the drive 210, the drive 220, and the drive 225, and writing the recovered data on the drive 230. The indicator 340 in the table is changed to indicate the stripe unit 270 of the replacement drive 230. In instances in which the stripe includes one row of the drive 230, the controller can generate new parity for the RAID array.

After checking indicator 340 which represents stripe unit 240, the controller should check a value of next indicator which indicates the next stripe unit. At 810, the controller adds "1" to the number of stripe unit. If the next stripe unit is not the end of stripe unit of the failed drive at 812, the controller checks a value of next indicator which indicates the next stripe unit at 804. For example, the value of indicator 342 is "0", so the controller uses UNMAP command (see FIG. 7a) or WRITE SAME command (see FIG. 7b) to write 0 to the replacement drive. And then, the controller continues to check the values of indicators 344 and 346 which indicate stripe units 244 and 246 respectively. The values of indicators 344 and 346 are "1", so the controller recovers the data 244 and 246 by performing XOR operations on the data written to the drive 210, the drive 220, and the drive 225, and writing the recovered data on the drive 230.

Finally, the controller checks the values of indicator 348 which indicates stripe unit 248. The value of indicator 348 is "0" too, so the controller uses SCSI command to write zero to the drive 230. Stripe unit 248 is the end of stripe unit in the failed drive 215 at 812, so the rebuild process is ending at 814.

When a drive failed, the controller can rebuild stripe unit without data by reading the table 300 instead of performing XOR operations in the comparatively larger number of stripes in the RAID array. In this manner, the controller can decrease an amount of time needed to recover the failed drive.

FIG. 9 is a block diagram of an example of a computing device 900 to implement embodiments according to the present invention. The device 900 can be implemented as the controller, such as those described in conjunction with the above Figures. One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, or other computing device including the same or similar elements as illustrated and described with regard to FIG. 9. Devices such as smartphones, tablets, and smartwatches are generally collectively referred to as mobile devices. Further, although the various data storage elements are illustrated as part of the computer 900, the storage may also or alternatively include cloud-based storage accessible via a network, such as the Internet.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 902 of the computer 900. A hard drive, CD-ROM, and RAM are some examples of articles including a non-transitory computer-readable medium, such as a storage device. The terms computer-readable medium and storage device do not include carrier waves. For example, a computer program 918 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A method performed by a redundant array of independent disks (RAID) controller in a RAID system having a plurality of drives storing a plurality of stripes, the method comprising:
when a drive in the RAID system fails, for a first stripe unit stored in the failed drive, obtaining from a bitmap, a first indicator indicating whether the first stripe unit contains written data, wherein the bitmap contains a plurality of indicators corresponding to stripe units stored in the failed drive, and the first stripe unit belongs to a first stripe stored in the RAID system, the first stripe unit including multiple chunks, and wherein the first indicator includes a stripe unit status indicator and multiple chunk status indicators corresponding to the multiple chunks, the stripe unit status indicator indicating whether the first stripe unit contains written data, and each chunk status indicator indicating whether a corresponding chunk contains written data;
determining that the stripe unit status indicator indicates that the first stripe unit contains written data and a first chunk status indicator of the first indicator indicates that a first chunk of the first stripe unit does not contain written data, and writing zeros into a first replacement chunk of a first replacement stripe unit, wherein the first replacement stripe unit replaces the first stripe unit in the first stripe; and
determining that the stripe unit status indicator indicates that the first stripe unit contains written data and a second chunk status indicator of the first indicator indicates that a second chunk of the first stripe unit contains written data, recovering data for the second chunk from data of corresponding chunks in other stripe units of the first stripe, and writing the recovered data into a second replacement chunk of the first replacement stripe unit.

2. The method of claim 1, before the drive in the RAID system fails, the method further comprising:
receiving a write command from a host, wherein the write command includes a logical block address (LBA);
mapping the LBA to the second chunk of the first stripe unit; and
updating the second chunk status indicator of the first indicator to indicate that the second chunk contains written data.

3. The method of claim 1, before the drive in the RAID system fails, the method further comprising:
receiving a delete command from a host, wherein the delete command includes a LBA;
mapping the LBA to the first chunk of the first stripe unit; and
updating the first chunk status indicator of the first indicator to indicate the first chunk does not contain data.

4. The method of claim 1, further comprising:
determining that each chunk status indicator indicates that a corresponding chunk does not contain written data, and setting the stripe unit status indicator indicating the first stripe unit does not contain written data.

5. The method of claim 1, further comprising:
determining that a second indicator indicates that a second stripe unit in the failed drive does not contain written data, and writing zeros into a second replacement stripe unit by using a small computer system interface unmap (SCSI UNMAP) command, wherein the second replacement stripe unit replaces the second stripe unit in a second stripe.

6. The method of claim 1, further comprising:
determining that a second indicator indicates that a second stripe unit in the failed drive does not contain written data, and writing zeros into a second replacement stripe unit by using a small computer system interface write same (SCSI WRITE SAME) command, wherein the second replacement stripe unit replaces the second stripe unit in a second stripe.

7. A redundant array of independent disks (RAID) controller in a RAID system having a plurality of drives storing a plurality of stripes, comprising:
a processor; and
a memory coupled to the processor and storing programming for execution by the processor;
when a drive in the RAID system fails, the processor is configured to execute the programming to perform operations of:
for a first stripe unit stored in the failed drive, obtain from a bitmap, a first indicator indicating whether the first stripe unit contains written data, wherein the bitmap contains a plurality of indicators corresponding to stripe units stored in the failed drive, and the first stripe unit belongs to a first stripe stored in the RAID system, the first stripe unit including multiple chunks, and wherein the first indicator includes a stripe unit status indicator and multiple chunk status indicators corresponding to the multiple chunks, the stripe unit status indicator indicating whether the first stripe unit contains written data, and each chunk status indicator indicating whether a corresponding chunk contains written data;
determine that the stripe unit status indicator indicates that the first stripe unit contains written data and a first chunk status indicator of the first indicator indicates that a first chunk of the first stripe unit does not contain written data, and write zeros into a first replacement chunk of a first replacement stripe unit, wherein the first replacement stripe unit replaces the first stripe unit in the first stripe; and
determine that the stripe unit status indicator indicates that the first stripe unit contains written data and a second chunk status indicator of the first indicator indicates that a second chunk of the first stripe unit contains written data, recover data for the second chunk from data of corresponding chunks in other stripe units of the first stripe, and write the recovered data into a second replacement chunk of the first replacement stripe unit.

8. The RAID controller of claim 7, wherein the processor is further configured to execute the programming to perform operations of:
receive a write command from a host, wherein the write command includes a logical block address (LBA);
map the LBA to the second chunk of the first stripe unit; and
update the second chunk status indicator of the first indicator to indicate that the second chunk contains written data.

9. The RAID controller of claim 7, wherein the processor is further configured to execute the programming to perform operations of:
receive a delete command from a host, wherein the delete command includes a LBA;
map the LBA to the first chunk of the first stripe unit; and
update the first chunk status indicator of the first indicator to indicate the first chunk does not contain data.

10. The RAID controller of claim 7, wherein the processor is further configured to:
determine that each chunk status indicator indicates that a corresponding chunk does not contain written data, and set the stripe unit status indicator indicating the first stripe unit does not contain written data.

11. The RAID controller of claim 7, wherein the processor is further configured to:
determine that each chunk status indicator indicates that a corresponding chunk does not contain written data, and write zeros into a second replacement stripe unit by using a small computer system interface unmap (SCSI UNMAP) command, wherein the second replacement stripe unit replaces the second stripe unit in a second stripe.

12. The RAID controller of claim 7, wherein the processor is further configured to:
determine that each chunk status indicator indicates that a corresponding chunk does not contain written data, and write zeros into a second replacement stripe unit by using a small computer system interface write same (SCSI WRITE SAME) command, wherein the second replacement stripe unit replaces the second stripe unit in a second stripe.

13. A redundant array of independent disks (RAID) system comprising: a RAID controller and a plurality of drives storing a plurality of stripes, the RAID controller being configured to:
when a drive in the RAID system fails, for a first stripe unit stored in the failed drive, obtain from a bitmap, a first indicator indicating whether the first stripe unit contains written data, wherein the bitmap contains a plurality of indicators corresponding to stripe units stored in the failed drive, and the first stripe unit belongs to a first stripe stored in the RAID system, the first stripe unit including multiple chunks, and wherein the first indicator includes a stripe unit status indicator and multiple chunk status indicators corresponding to the multiple chunks, the stripe unit status indicator indicating whether the first stripe unit contains written data, and each chunk status indicator indicating whether a corresponding chunk contains written data;
determine that the stripe unit status indicator indicates that the first stripe unit contains written data and a first chunk status indicator of the first indicator indicates that a first chunk of the first stripe unit does not contain written data, and write zeros into a first replacement chunk of a first replacement stripe unit, wherein the first replacement stripe unit replaces the first stripe unit in the first stripe; and
determine that the stripe unit status indicator indicates that the first stripe unit contains written data and a second chunk status indicator of the first indicator indicates that a second chunk of the first stripe unit contains written data, recover data for the second chunk from data of corresponding chunks in other stripe units of the first stripe, and write the recovered data into a second replacement chunk of the first replacement stripe unit.

14. The RAID system of claim 13, wherein the RAID controller is further configured to:
receive a write command from a host, wherein the write command includes a logical block address (LBA);
map the LBA to the second chunk of the first stripe unit; and
update the second chunk status indicator of the first indicator to indicate that the second chunk contains written data.

15. The RAID system of claim 13, wherein the RAID controller is further configured to:

receive a delete command from a host, wherein the delete command includes a LBA;
map the LBA to the first chunk of the first stripe unit; and
update the first chunk status indicator of the first indicator to indicate the first chunk does not contain data.

16. The RAID system of claim 13, wherein the bitmap is stored in a non-volatile memory of the RAID controller, and the plurality of drives comprise solid state drives or hard disk drives.

17. The RAID system of claim 13, wherein the RAID controller is further configured to:
determine that each chunk status indicator indicates that a corresponding chunk does not contain written data, and set the stripe unit status indicator indicating the first stripe unit does not contain written data.

18. The RAID system of claim 13, wherein the RAID controller is further configured to:
determine that a second indicator indicates that a second stripe unit in the failed drive does not contain written data, and write zeros into a second replacement stripe unit by using a small computer system interface unmap (SCSI UNMAP) command, wherein the second replacement stripe unit replaces the second stripe unit in a second stripe.

19. The RAID system of claim 13, wherein the RAID controller is further configured to:
determine that a second indicator indicates that a second stripe unit in the failed drive does not contain written data, and write zeros into a second replacement stripe unit by using a small computer system interface write same (SCSI WRITE SAME) command, wherein the second replacement stripe unit replaces the second stripe unit in a second stripe.

* * * * *